US009943810B2

(12) United States Patent
Paul et al.

(10) Patent No.: US 9,943,810 B2
(45) Date of Patent: Apr. 17, 2018

(54) COMPOSITE POLYAMIDE MEMBRANE POST-TREATED WITH NITROUS ACID

(71) Applicant: Dow Global Technologies LLC, Midland, MI (US)

(72) Inventors: Mou Paul, Edina, MN (US); Matthew J. Jansma, Midland, MI (US); Abhishek Roy, Edina, MN (US); Ian A. Tomlinson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/301,981

(22) PCT Filed: May 5, 2015

(86) PCT No.: PCT/US2015/029141
§ 371 (c)(1),
(2) Date: Oct. 5, 2016

(87) PCT Pub. No.: WO2015/175258
PCT Pub. Date: Nov. 19, 2015

(65) Prior Publication Data
US 2017/0203259 A1 Jul. 20, 2017

Related U.S. Application Data

(60) Provisional application No. 61/992,965, filed on May 14, 2014.

(51) Int. Cl.
| | |
|---|---|
| *B01D 69/12* | (2006.01) |
| *B01D 67/00* | (2006.01) |
| *B01D 71/56* | (2006.01) |
| *C09D 177/00* | (2006.01) |
| *C08G 69/48* | (2006.01) |
| *B05D 3/10* | (2006.01) |

(52) U.S. Cl.
CPC ....... *B01D 69/125* (2013.01); *B01D 67/0006* (2013.01); *B01D 67/0093* (2013.01); *B01D 71/56* (2013.01); *B05D 3/107* (2013.01); *B05D 3/108* (2013.01); *C08G 69/48* (2013.01); *C09D 177/00* (2013.01); *B01D 2323/40* (2013.01)

(58) Field of Classification Search
None
See application file for complete search history.

(56) References Cited

U.S. PATENT DOCUMENTS

| | | | |
|---|---|---|---|
| 3,304,310 A | 2/1967 | Hari et al. | |
| 3,686,116 A | 8/1972 | Rio | |
| 3,694,390 A | 9/1972 | Winslow | |
| 3,878,109 A | 4/1975 | Ikeda et al. | |
| 4,259,183 A | 3/1981 | Cadotte | |
| 4,265,745 A | 5/1981 | Kawaguchi et al. | |
| 4,277,344 A | 7/1981 | Cadotte | |
| 4,529,646 A | 7/1985 | Sundet | |
| 4,606,943 A | 8/1986 | Rak et al. | |
| 4,626,468 A | 12/1986 | Sundet | |
| 4,643,829 A | 2/1987 | Sundet | |
| 4,719,062 A | 1/1988 | Sundet | |
| 4,758,343 A | 7/1988 | Sasaki et al. | |
| 4,761,234 A | 8/1988 | Uemura et al. | |
| 4,769,148 A | 9/1988 | Fibiger et al. | |
| 4,783,346 A | 11/1988 | Sundet | |
| 4,812,270 A | 3/1989 | Cadotte et al. | |
| 4,830,885 A | 5/1989 | Tran et al. | |
| 4,872,984 A | 10/1989 | Tomaschke | |
| 4,888,116 A | 12/1989 | Cadotte et al. | |
| 4,948,507 A | 8/1990 | Tomaschke | |
| 4,950,404 A | 8/1990 | Chau | |
| 4,960,517 A | 10/1990 | Cadotte | |
| 5,015,380 A | 5/1991 | Sundet | |
| 5,015,382 A | 5/1991 | Sundet | |
| 5,019,264 A | 5/1991 | Arthur | |

(Continued)

FOREIGN PATENT DOCUMENTS

| | | |
|---|---|---|
| CN | 1035338 | 9/1989 |
| CN | 1935338 | 3/2007 |

(Continued)

OTHER PUBLICATIONS

Li et al, Polyamide Thin Film Composite Membranes Prepared from Isomeric Biphenyl Tetraacyl Chloride and m-phenylenediamine, Journal of Membrane Science, 315, (2008) 20-27.

(Continued)

*Primary Examiner* — Erma C Cameron
(74) *Attorney, Agent, or Firm* — Edward W. Black

(57) ABSTRACT

A method for making a composite polyamide membrane comprising a porous support and a polyamide layer, including the steps of: i) applying a polar solution comprising a polyfunctional amine monomer and a non-polar solution comprising a polyfunctional acyl halide monomer to a surface of a porous support and interfacially polymerizing the monomers to form a polyamide layer; and ii) exposing the thin film polyamide layer to nitrous acid; wherein the method is characterized by at least one of: conducting the interfacial polymerization of step i) in the presence of a subject amine compound, or applying a subject amine compound to the interfacially polymerized polyamide layer prior to step ii), wherein the subject amine compound is different from the polyfunctional acyl halide and polyfunctional amine monomers.

(I)

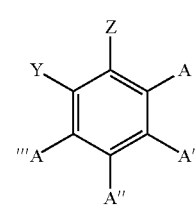

10 Claims, No Drawings

(56) References Cited

U.S. PATENT DOCUMENTS

| | | | |
|---|---|---|---|
| 5,024,765 A * | 6/1991 | Linder | B01D 67/0093 210/490 |
| 5,032,282 A * | 7/1991 | Linder | B01D 67/0093 210/490 |
| 5,049,282 A | 9/1991 | Linder et al. | |
| 5,051,178 A | 9/1991 | Uemura et al. | |
| 5,160,619 A | 11/1992 | Yamaguchi et al. | |
| 5,180,802 A | 1/1993 | Hartman et al. | |
| 5,246,587 A | 9/1993 | Tomaschke | |
| 5,254,261 A | 10/1993 | Tomaschke et al. | |
| 5,290,452 A | 3/1994 | Schucker | |
| 5,336,409 A | 8/1994 | Hachisuka et al. | |
| 5,510,527 A | 4/1996 | Hachisuka et al. | |
| 5,576,057 A | 11/1996 | Hirose et al. | |
| 5,582,725 A | 12/1996 | McCray et al. | |
| 5,593,588 A | 1/1997 | Kim et al. | |
| 5,614,099 A | 3/1997 | Hirose et al. | |
| 5,616,249 A | 4/1997 | Hodgdon | |
| 5,693,227 A | 12/1997 | Costa | |
| 5,733,602 A | 3/1998 | Hirose et al. | |
| 5,744,039 A | 4/1998 | Itoh et al. | |
| 5,783,079 A | 7/1998 | Kumano et al. | |
| 5,843,351 A | 12/1998 | Hirose et al. | |
| 5,876,602 A | 3/1999 | Jons et al. | |
| 5,989,426 A | 11/1999 | Hirose et al. | |
| 6,024,873 A | 2/2000 | Hirose et al. | |
| 6,086,764 A | 7/2000 | Linder et al. | |
| 6,162,358 A | 12/2000 | Li et al. | |
| 6,245,234 B1 | 6/2001 | Koo et al. | |
| 6,280,853 B1 | 8/2001 | Mickols | |
| 6,337,018 B1 | 1/2002 | Mickols | |
| 6,406,626 B1 | 1/2002 | Murakami et al. | |
| 6,464,873 B1 | 10/2002 | Tomaschke | |
| 6,521,130 B1 | 2/2003 | Kona et al. | |
| 6,562,266 B2 | 5/2003 | Mickols | |
| 6,723,241 B2 | 4/2004 | Mickols | |
| 6,723,422 B1 | 4/2004 | Hirose et al. | |
| 6,777,488 B1 | 8/2004 | Araki et al. | |
| 6,878,278 B2 | 4/2005 | Mickols | |
| 7,279,097 B2 | 10/2007 | Tomioka et al. | |
| 7,806,275 B2 | 10/2010 | Murphy et al. | |
| 7,815,987 B2 | 10/2010 | Mickols et al. | |
| 8,147,735 B2 | 4/2012 | Buschmann | |
| 8,177,978 B2 | 5/2012 | Kurth et al. | |
| 8,567,612 B2 | 10/2013 | Kurth et al. | |
| 8,603,340 B2 | 12/2013 | Kurth et al. | |
| 8,968,828 B2 | 3/2015 | Roy et al. | |
| 8,999,449 B2 | 4/2015 | Paul et al. | |
| 9,073,015 B2 | 7/2015 | Rosenburg et al. | |
| 2008/0185332 A1 | 8/2008 | Niu et al. | |
| 2009/0071903 A1 | 3/2009 | Nakatsuji et al. | |
| 2009/0107922 A1 | 4/2009 | Zhang et al. | |
| 2009/0220690 A1 | 9/2009 | Niu et al. | |
| 2009/0272692 A1 | 11/2009 | Kurth et al. | |
| 2010/0062156 A1 | 3/2010 | Kurth et al. | |
| 2010/0181250 A1 | 7/2010 | Youn-Kook | |
| 2011/0005997 A1 | 1/2011 | Kurth et al. | |
| 2011/0049055 A1 | 3/2011 | Wang et al. | |
| 2012/0003387 A1 | 1/2012 | Kim et al. | |
| 2012/0080058 A1 | 4/2012 | Isaias et al. | |
| 2012/0248027 A1 | 10/2012 | Sasaki et al. | |
| 2012/0261332 A1 | 10/2012 | Takagi et al. | |
| 2012/0261344 A1 | 10/2012 | Kurth et al. | |
| 2012/0305473 A1 | 12/2012 | Ogawa et al. | |
| 2013/0089727 A1 | 4/2013 | Nilsen et al. | |
| 2013/0126419 A1 | 5/2013 | Ogawa et al. | |
| 2013/0256215 A1 | 10/2013 | Nakatsuji et al. | |
| 2013/0287944 A1 | 10/2013 | Paul et al. | |
| 2013/0287946 A1 | 10/2013 | Jons et al. | |
| 2014/0170314 A1 | 6/2014 | Zhang et al. | |
| 2014/0199483 A1 | 7/2014 | Roy et al. | |
| 2014/0206900 A1 | 7/2014 | Qiu et al. | |
| 2014/0231338 A1 | 9/2014 | Takaya et al. | |
| 2014/0264161 A1 | 9/2014 | Roy et al. | |
| 2014/0264162 A1 | 9/2014 | Qui et al. | |
| 2014/0272134 A1 | 9/2014 | Roy et al. | |
| 2014/0370191 A1 | 12/2014 | Rosenberg et al. | |
| 2015/0129485 A1 | 5/2015 | Roy et al. | |
| 2015/0147470 A1 | 5/2015 | Arrowood et al. | |
| 2015/0151255 A1 | 6/2015 | Roy et al. | |
| 2015/0157990 A1 | 6/2015 | Roy et al. | |
| 2015/0165387 A1 | 6/2015 | Roy et al. | |
| 2015/0174534 A1 | 6/2015 | Paul et al. | |
| 2015/0298066 A1 | 10/2015 | Roy et al. | |
| 2015/0306548 A1 | 10/2015 | Roy et al. | |
| 2015/0314243 A1 | 11/2015 | Roy et al. | |
| 2016/0008773 A1 * | 1/2016 | Yoneda | B01D 71/56 210/500.33 |
| 2016/0243503 A1 * | 8/2016 | Okabe | B01D 69/02 |

FOREIGN PATENT DOCUMENTS

| | | |
|---|---|---|
| CN | 102219673 | 10/2011 |
| EP | 556569 | 11/1993 |
| WO | 2007133362 | 11/2007 |
| WO | 2013048762 | 4/2013 |
| WO | 2013048763 | 4/2013 |
| WO | 2013048765 | 4/2013 |
| WO | 2014014664 | 1/2014 |
| WO | 2015084511 | 6/2015 |
| WO | 2015084512 | 6/2015 |
| WO | 2015105630 | 7/2015 |
| WO | 2015105631 | 7/2015 |
| WO | 2015105632 | 7/2015 |
| WO | 2015105636 | 7/2015 |
| WO | 2015105637 | 7/2015 |
| WO | 2015105638 | 7/2015 |
| WO | 2015105639 | 7/2015 |
| WO | 2015175254 | 11/2015 |
| WO | 2015175256 | 11/2015 |

OTHER PUBLICATIONS

Petersen, Composite Reverse Osmosis and Nanofiltration Membranes, Journal of Membrane Science, 83, (1993) 81-150.

McMurry, Relative Reactivity of Carboxylic Acid Derivatives, Organic Chemistry, Ch. 21, 808-810.

* cited by examiner

COMPOSITE POLYAMIDE MEMBRANE POST-TREATED WITH NITROUS ACID

FIELD

The present invention is generally directed toward composite polyamide membranes along with methods for making and using the same.

INTRODUCTION

Composite polyamide membranes are used in a variety of fluid separations. One common class of membranes includes a porous support coated with a "thin film" polyamide layer. The thin film layer may be formed by an interfacial polycondensation reaction between polyfunctional amine (e.g. m-phenylenediamine) and polyfunctional acyl halide (e.g. trimesoyl chloride) monomers which are sequentially coated upon the support from immiscible solutions, see for example U.S. Pat. No. 4,277,344 to Cadotte. Various constituents may be added to one or both of the coating solutions to improve membrane performance. For example, U.S. Pat. No. 6,878,278 to Mickols describes the addition of a wide range of additives to one or both coating solutions including various tri-hydrocarbyl phosphate compounds. US2013/0287944, US2013/0287945, US2013/0287946, WO2013/048765 and WO2013/103666 describe the addition of various monomers that include both carboxylic acid and amine-reactive functional groups in combination with various tri-hydrocarbyl phosphate compounds.

U.S. Pat. No. 4,888,116 to Cadotte describes the use of combinations of bi- and tri-functional acyl halide monomers, e.g. isophthaloyl chloride or terephthaloyl chloride with trimesoyl chloride. The resulting polyamide layer is subsequently post-treated with a reagent (nitrous acid) to form diazonium salt groups and corresponding derivatives (e.g. azo linkages) from unreacted pendant amine groups. See also WO2013/047398, US2013/0256215, US2013/0126419, US2012/0305473, US2012/0261332 and US2012/0248027. The concentration and location of the azo groups in the membrane are specific to the number of amine end groups and their distribution along the polymer chains and the relative rates of diazonium salt hydrolysis and azo coupling. As a consequence, the number of possible azo groups is limited and the formation of inter-chain cross linking only occurs through end groups in between two different polymer chains. Hence this approach limits the number of possible azo groups and introduces inter-chain cross linking only through end groups in between two different polymer chains.

In one embodiment, the invention eliminates this restriction and provides synthetic routes to increase the number of azo groups and also introduces intra chain crosslinking through multiple sites on the polymer backbone. This creates a tighter and more uniform polymer network. In another embodiment, the invention eliminates the above-mentioned restriction and provides synthetic routes to increase the number of azo groups preferentially distributed near the surface of the polymer. In contrast to distributing azo crosslinking uniformly throughout the whole polymer, this embodiment preferentially "tightens up" the surface and not the bulk of the membrane. As a result, the openness of the polymer in the bulk is preserved and a gradient of cross-linking density from the feed side surface to the polysulfone support facing surface is created with the feed side of the membrane being more crosslinked. This unique structure improves selectivity between water and salt transport. Specifically the neutral and larger molecules are more efficiently rejected without sacrificing the flux of the membrane.

SUMMARY

The invention includes a method for making a composite polyamide membrane including a porous support and a thin film polyamide layer. The method includes the steps of: i) applying a polar solution comprising a polyfunctional amine monomer and a non-polar solution comprising a polyfunctional acyl halide monomer to a surface of a porous support and interfacially polymerizing the monomers to form a polyamide layer; and ii) exposing the thin film polyamide layer to nitrous acid. The method is characterized by at least one of: conducting the interfacial polymerization of step i) in the presence of a subject amine compound, or applying a subject amine compound to the interfacially polymerized polyamide layer prior to step ii), wherein the subject amine compound is different from the polyfunctional amine monomer and is represented by the following formula:

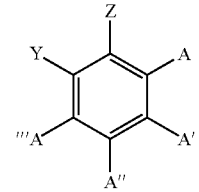

wherein:

Z is selected from: hydroxyl, alkoxy, ester, secondary or tertiary amine, and keto-amide;

Y is selected from: hydrogen, carboxylic acid, sulfonic acid or salt thereof, halogen, and an alkyl group having from 1 to 12 carbon atoms; and A, A', A" and A'" are independently selected from: Z, hydrogen, amine with the proviso that at least one of A, A', A" and A'" is a primary or secondary amine and that at least one of Y, A or A" is hydrogen.

Many additional embodiments are described.

DETAILED DESCRIPTION

The invention is not particularly limited to a specific type, construction or shape of membrane or application. For example, the present invention is applicable to flat sheet, tubular and hollow fiber polyamide membranes useful in a variety of applications including forward osmosis (FO), reverse osmosis (RO), nano filtration (NF), ultra filtration (UF), micro filtration (MF) and pressure retarded fluid separations. However, the invention is particularly useful in the preparation of asymmetric membranes designed for RO and NF separations. RO membranes are relatively impermeable to virtually all dissolved salts and typically reject more than about 95% of salts having monovalent ions such as sodium chloride. RO composite membranes also typically reject more than about 95% of inorganic molecules as well as organic molecules with molecular weights greater than approximately 100 AMU (Daltons). NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 AMU.

Examples of composite polyamide membranes include FilmTec Corporation FT-30™ type membranes, i.e. a flat sheet composite membrane comprising a bottom layer (back side) of a nonwoven backing web (e.g. PET scrim), a middle layer of a porous support having a typical thickness of about 25-125 μm and top layer (front side) comprising a thin film polyamide layer having a thickness typically less than about 1 micron, e.g. from 0.01 micron to 1 micron but more commonly from about 0.01 to 0.1 μm. The porous support is typically a polymeric material having pore sizes which are of sufficient size to permit essentially unrestricted passage of permeate but not large enough so as to interfere with the bridging over of a thin film polyamide layer formed thereon. For example, the pore size of the support preferably ranges from about 0.001 to 0.5 μm. Non-limiting examples of porous supports include those made of: polysulfone, polyether sulfone, polyimide, polyamide, polyetherimide, polyacrylonitrile, poly(methyl methacrylate), polyethylene, polypropylene, and various halogenated polymers such as polyvinylidene fluoride. For RO and NF applications, the porous support provides strength but offers little resistance to fluid flow due to its relatively high porosity.

Due to its relative thinness, the polyamide layer is often described in terms of its coating coverage or loading upon the porous support, e.g. from about 2 to 5000 mg of polyamide per square meter surface area of porous support and more preferably from about 50 to 500 mg/m². The polyamide layer is preferably prepared by an interfacial polycondensation reaction between a polyfunctional amine monomer and a polyfunctional acyl halide monomer upon the surface of the porous support as described in U.S. Pat. No. 4,277,344 and U.S. Pat. No. 6,878,278. More specifically, the polyamide membrane layer may be prepared by interfacially polymerizing a polyfunctional amine monomer with a polyfunctional acyl halide monomer, (wherein each term is intended to refer both to the use of a single species or multiple species), on at least one surface of a porous support. As used herein, the term "polyamide" refers to a polymer in which amide linkages (—C(O)NH—) occur along the molecular chain. The polyfunctional amine and polyfunctional acyl halide monomers are most commonly applied to the porous support by way of a coating step from solution, wherein the polyfunctional amine monomer is typically coated from an aqueous-based or polar solution and the polyfunctional acyl halide from an organic-based or non-polar solution. Although the coating steps need not follow a specific order, the polyfunctional amine monomer is preferably first coated on the porous support followed by the polyfunctional acyl halide. Coating can be accomplished by spraying, film coating, rolling, or through the use of a dip tank among other coating techniques. Excess solution may be removed from the support by air knife, dryers, ovens and the like.

The polyfunctional amine monomer comprises at least two primary amine groups and may be aromatic (e.g., m-phenylenediamine (mPD), p-phenylenediamine, 1,3,5-triaminobenzene, 1,3,4-triaminobenzene, 3,5-diaminobenzoic acid, 2,4-diaminotoluene, 2,4-diaminoanisole, and xylylenediamine) or aliphatic (e.g., ethylenediamine, propylenediamine, cyclohexanne-1,3-diamine and tris (2-aminoethyl) amine). Diamines are preferred. One particularly preferred polyfunctional amine is m-phenylene diamine (mPD). The polyfunctional amine monomer may be applied to the porous support as a polar solution. The polar solution may contain from about 0.1 to about 10 wt % and more preferably from about 1 to about 6 wt % polyfunctional amine monomer. In one set of embodiments, the polar solutions includes at least 2.5 wt % (e.g. 2.5 to 6 wt %) of the polyfunctional amine monomer. Once coated on the porous support, excess solution may be optionally removed.

The polyfunctional acyl halide monomer comprises at least two acyl halide groups and preferably no carboxylic acid functional groups and may be coated from a non-polar solvent although the polyfunctional acyl halide may be alternatively delivered from a vapor phase (e.g., for polyfunctional acyl halides having sufficient vapor pressure). The polyfunctional acyl halide is not particularly limited and aromatic or alicyclic polyfunctional acyl halides can be used along with combinations thereof. Non-limiting examples of aromatic polyfunctional acyl halides include: trimesic acyl chloride, terephthalic acyl chloride, isophthalic acyl chloride, biphenyl dicarboxylic acyl chloride, and naphthalene dicarboxylic acid dichloride. Non-limiting examples of alicyclic polyfunctional acyl halides include: cyclopropane tri carboxylic acyl chloride, cyclobutane tetra carboxylic acyl chloride, cyclopentane tri carboxylic acyl chloride, cyclopentane tetra carboxylic acyl chloride, cyclohexane tri carboxylic acyl chloride, tetrahydrofuran tetra carboxylic acyl chloride, cyclopentane dicarboxylic acyl chloride, cyclobutane dicarboxylic acyl chloride, cyclohexane dicarboxylic acyl chloride, and tetrahydrofuran dicarboxylic acyl chloride. One preferred polyfunctional acyl halide is trimesoyl chloride (TMC). The polyfunctional acyl halide may be dissolved in a non-polar solvent in a range from about 0.01 to 10 wt %, preferably 0.05 to 3% wt % and may be delivered as part of a continuous coating operation. In one set of embodiments wherein the polyfunctional amine monomer concentration is less than 3 wt %, the polyfunctional acyl halide is less than 0.3 wt %.

Suitable non-polar solvents are those which are capable of dissolving the polyfunctional acyl halide and which are immiscible with water; e.g. paraffins (e.g. hexane, cyclohexane, heptane, octane, dodecane), isoparaffins (e.g. ISOPAR™ L), aromatics (e.g. Solvesso™ aromatic fluids, Varsol™ non-dearomatized fluids, benzene, alkylated benzene (e.g. toluene, xylene, trimethylbenzene isomers, diethylbenzene)) and halogenated hydrocarbons (e.g. FREON™ series, chlorobenzene, di and trichlorobenzene) or mixtures thereof. Preferred solvents include those which pose little threat to the ozone layer and which are sufficiently safe in terms of flashpoints and flammability to undergo routine processing without taking special precautions. A preferred solvent is ISOPAR™ available from Exxon Chemical Company. The non-polar solution may include additional constituents including co-solvents, phase transfer agents, solubilizing agents, complexing agents and acid scavengers wherein individual additives may serve multiple functions. Representative co-solvents include: benzene, toluene, xylene, mesitylene, ethyl benzene-diethylene glycol dimethyl ether, cyclohexanone, ethyl acetate, butyl Carbitol™ acetate, methyl laurate and acetone. A representative acid scavenger includes N, N-diisopropylethylamine (DIEA). The non-polar solution may also include small quantities of water or other polar additives but preferably at a concentration below their solubility limit in the non-polar solution.

One or both of the polar and non-polar coating solutions may additionally include tri-hydrocarbyl phosphate compounds as represented by Formula I:

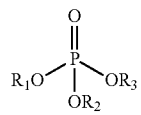

Formula (I)

wherein "P" is phosphorous, "O" is oxygen and $R_1$, $R_2$ and $R_3$ are independently selected from hydrogen and hydrocarbyl groups comprising from 1 to 10 carbon atoms, with the proviso that no more than one of $R_1$, $R_2$ and $R_3$ are hydrogen. $R_1$, $R_2$ and $R_3$ are preferably independently selected from aliphatic and aromatic groups. Applicable aliphatic groups include both branched and unbranched species, e.g. methyl, ethyl, propyl, isopropyl, butyl, isobutyl, pentyl, 2-pentyl, 3-pentyl. Applicable cyclic groups include cyclopentyl and cyclohexyl. Applicable aromatic groups include phenyl and naphthyl groups. Cyclo and aromatic groups may be linked to the phosphorous atom by way of an aliphatic linking group, e.g., methyl, ethyl, etc. The aforementioned aliphatic and aromatic groups may be unsubstituted or substituted (e.g., substituted with methyl, ethyl, propyl, hydroxyl, amide, ether, sulfone, carbonyl, ester, cyanide, nitrile, isocyanate, urethane, beta-hydroxy ester, etc.); however, unsubstituted alkyl groups having from 3 to 10 carbon atoms are preferred. Specific examples of tri-hydrocarbyl phosphate compounds include: triethyl phosphate, tripropyl phosphate, tributyl phosphate, tripentyl phosphate, trihexyl phosphate, triphenyl phosphate, propyl biphenyl phosphate, dibutyl phenyl phosphate, butyl diethyl phosphate, dibutyl hydrogen phosphate, butyl heptyl hydrogen phosphate and butyl heptyl hexyl phosphate. The species selected should be at least partially soluble in the solution from which it is coated, i.e. polar versus non-polar coating solution. Additional examples are as such compounds are described in U.S. Pat. No. 6,878,278, U.S. Pat. No. 6,723,241, U.S. Pat. No. 6,562,266 and U.S. Pat. No. 6,337,018. In one preferred embodiment, the non-polar solution may include from 0.001 to 10 wt % and more preferably from 0.01 to 1 wt % of the tri-hydrocarbyl phosphate compound. In another embodiment, the non-polar solution includes the tri-hydrocarbyl phosphate compound in a molar (stoichiometric) ratio of 1:5 to 5:1 and more preferably 1:1 to 3:1 with the polyfunctional acyl halide monomer.

In addition to the polyfunctional amine and acyl halide monomers, additional carboxylic acid containing monomers may be optionally included in the interfacial polymerization. Representative examples are described in: US2013/0287944, US2013/0287945, US2013/0287946, WO2013/048765 and WO2013/103666.

Once brought into contact with one another, the polyfunctional acyl halide and polyfunctional amine monomers react at their surface interface to form a polyamide layer or film. This layer, often referred to as a polyamide "discriminating layer" or "thin film layer," provides the composite membrane with its principal means for separating solute (e.g. salts) from solvent (e.g. aqueous feed). The reaction time of the polyfunctional acyl halide and the polyfunctional amine monomer may be less than one second but contact times typically range from about 1 to 60 seconds. The removal of the excess solvent can be achieved by rinsing the membrane with water and then drying at elevated temperatures, e.g. from about 40° C. to about 120° C., although air drying at ambient temperatures may be used. However, for purposes of the present invention, the membrane is preferably not permitted to dry and is simply rinsed with or dipped in water and optionally stored in a wet state.

The invention further includes the addition of a "subject" amine compound as represented below by Formula II. The subject amine compound is different from the aforementioned monomers including the polyfunctional amine monomer. In one embodiment, the subject amine compound is present during the interfacial polymerization of the polyfunctional amine and acyl halide monomers, e.g. such as by way of combination with the polyfunctional amine monomer and coated from a polar solution such that the compound is incorporated throughout the resulting polyamide layer. In an alternative embodiment, the subject amine compound is applied to the polyamide layer after its formation, e.g. by way of a subsequent coating step. In this alternative embodiment, the subject amine compound preferentially reacts with residual acid chloride groups present on the surface of the polyamide layer. In yet another embodiment, the subject amine compound is present during the interfacial polymerization and is also applied to the resulting polyamide layer. The specific technique for adding or applying the subject amine compound is not particularly limited and includes applying the amine compound (e.g. 10-20000 ppm) from a polar or a non-polar solution, or soaking the polyamide layer in a dip tank containing the subject amine compound such that the polyamide layer becomes impregnated with the compound. After treatment with the subject amine compound, the polyamide layer is exposed to nitrous acid.

The subject amine compound may be represented by formula II.

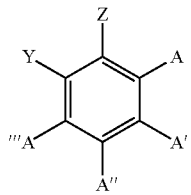

Formula II wherein:

Z is selected from: hydroxyl (—OH), alkoxy (e.g. including an alkyl group having from 1 to 5 carbons, preferably methoxy, —OCH$_3$), ester (e.g. —O—CO—CH$_3$), secondary or tertiary amine (e.g. —NHR, —NRR' where R and R' are alkyl groups preferably having from 1 to 5 carbon atoms), and keto-amide (e.g. —NH—CO—CH$_2$—CO—CH$_3$);

Y is selected from: hydrogen (—H), carboxylic acid (—COOH), sulfonic acid or salt thereof (—SO$_3$H), halogen (—F, —Cl, —Br, —I), and an alkyl group having from 1 to 12 carbon atoms; and A, A', A" and A'" are independently selected from: Z, hydrogen and amine (primary, secondary or tertiary but preferably primary or secondary including an alkyl group having from 1 to 5 carbon atoms) with the proviso that at least one of A, A', A" and A'" is an amine (primary or secondary), and that at least one of Y, A or A" is hydrogen.

In a preferred subset of embodiments: 1) Z and at least one of A' or A'" is hydroxyl with the proviso that at least one of A or Y is hydrogen; 2) Z and at least one of A' or A'" is a secondary or tertiary amine with the proviso that at least one of A or Y is hydrogen; 3) Z is selected from: hydroxyl or methoxy; Y is selected from: hydrogen, halogen or carboxylic acid; and A, A', A" and A'" are independently selected from: hydrogen and amine with the proviso that at least one of A, A', A" and A'" is a primary or secondary amine and that at least one of A or A" is hydrogen; 4) Z is selected from hydroxyl, A' is selected from hydroxyl and A is hydrogen provided at least one of A", A'" or Y is an amine; and 5) Z is selected from hydroxyl, A'" is selected from hydroxyl, Y is hydrogen provided at least one of A, A' or A" is a primary or secondary amine. In each case, hydroxyl groups may be "protected" as an acetate or substituted silane (e.g. tert-butyl-dimethylsilane). The "protected" groups may be subsequently removed prior to post-treatment with nitrous acid by simply washing the membrane with an aqueous solution.

Preferred species of the subject amine compound include: 3,5-diaminophenol, 2,4-diaminophenol, 3-aminophenol, 2-aminophenol, 4-aminophenol, 5-aminobenzene-1,3-diol, 3-amino-5-hydroxybenzoic acid, 3-amino-5-hydroxybenzenesulfonic acid, 5-methoxybenzene-1,3-diamine, 4-methoxybenzene-1,3-diamine, 3-methoxyaniline, 2-methoxyaniline, 4-methoxyaniline, 3-amino-5-methoxybenzoic acid, 3-amino-5-methoxybenzenesulfonic acid, N1,N1-dimethylbenzene-1,3-diamine, N11,N1-dimethylbenzene-1,3,5-triamine, N1,N1,N3,N3-tetramethylbenzene-1,3,5-triamine,N,N'-(5-amino-1,3-phenylene)bis(3-oxobutanamide), N-(4-aminophenyl)-3-oxobutanamide, 5-amino-1,3-phenylene bis(2,2,2-trifluoroacetate), 5-amino-1,3-phenylene diacetate, 3,5-bis((tert-butyldimethylsilyl)oxy) aniline, (3,5-bis((tert-butyldimethylsilyl) oxy)phenyl) methanamine, 2-(3,5-bis((tert-butyldimethylsilyl) oxy) phenyl) ethanamine. Representative chemical formula are as follows:

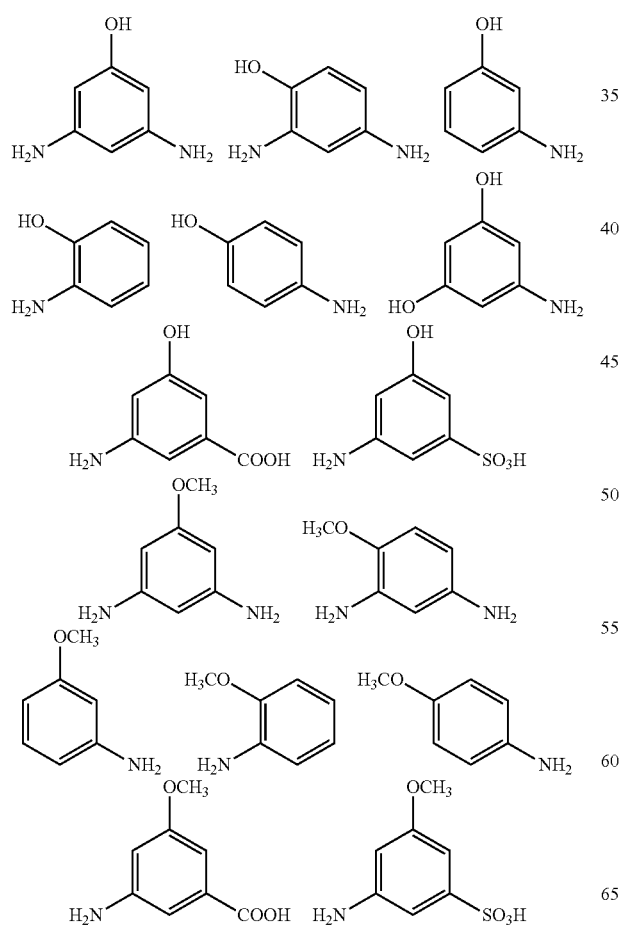
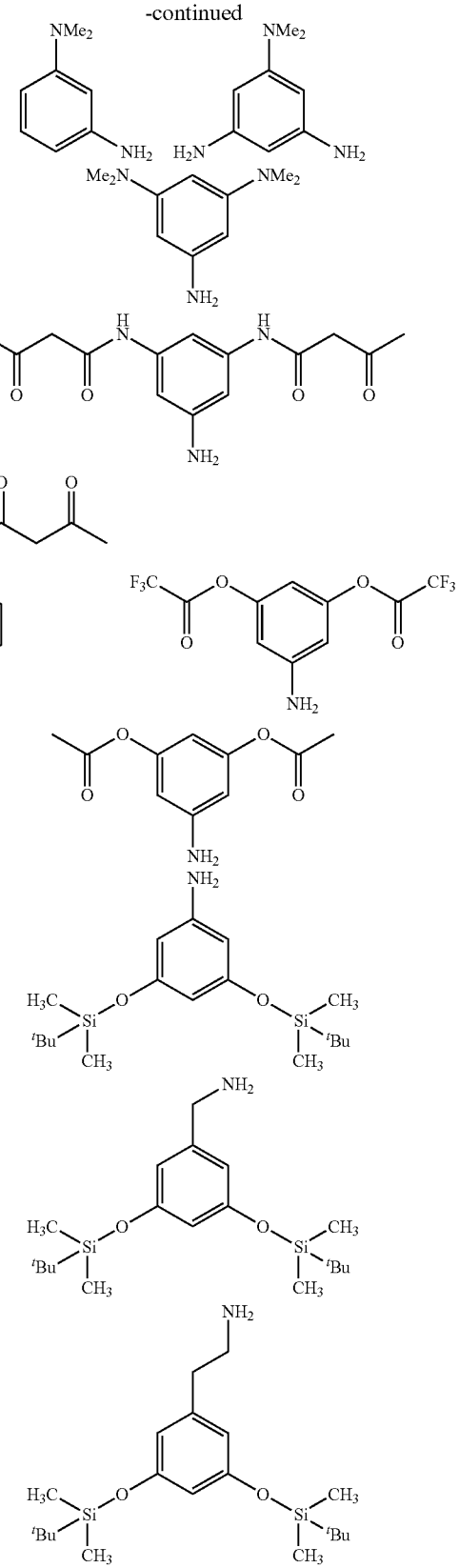

A variety of applicable techniques for post-treating the polyamide layer with nitrous acid are described in U.S. Pat. No. 4,888,116 and are incorporated herein by reference. It is believed that the nitrous acid reacts with the residual primary amine groups present in the polyamide discrimination layer to form diazonium salt groups, a portion of which react with the subject activated amine compounds, residual unreacted amines in the polyamide layer or phenols resulting hydrolysis of the diazonium salt to form azo groups, i.e. form crosslinks in the polyamide structure. A representative reaction scheme is provided below.

Because nitrous acid is volatile and subject to decomposition, it is preferably formed by reaction of an alkali metal nitrite in an acidic solution in contact with the polyamide discriminating layer. Generally, if the pH of the aqueous solution is less than about 7, (preferably less than about 5), an alkali metal nitrite will react to liberate nitrous acid. Sodium nitrite reacted with hydrochloric or sulfuric acid in an aqueous solution is especially preferred for formation of

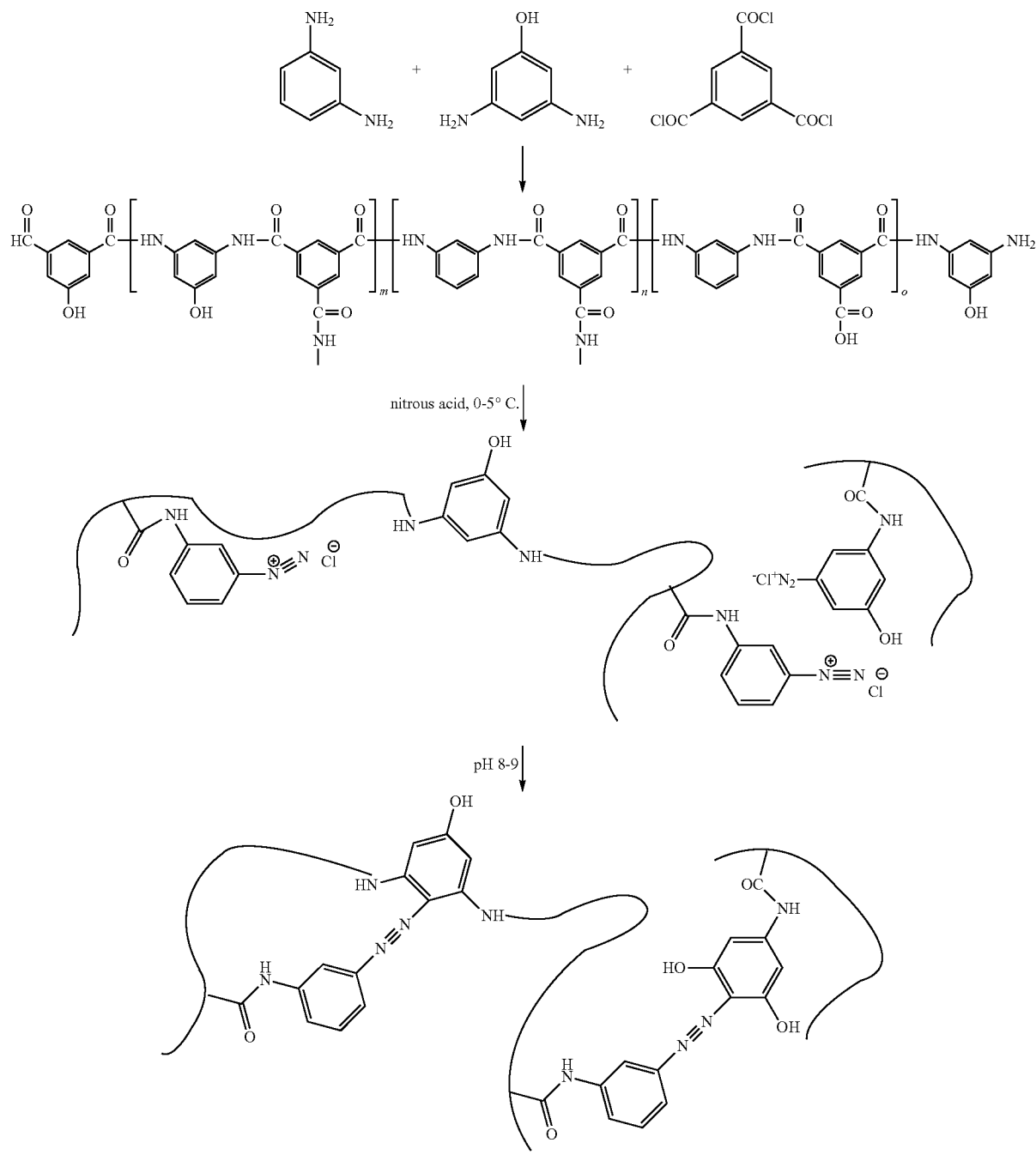

In one embodiment, an aqueous solution of nitrous acid is applied to the thin film polyamide layer. Although the aqueous solution may include nitrous acid, it preferably includes reagents that form nitrous acid in situ, e.g. an alkali metal nitrite in an acid solution or nitrosyl sulfuric acid.

nitrous acid. The aqueous solution may further include wetting agents or surfactants. The concentration of the nitrous acid in the aqueous solution is preferably from 0.01 to 1 wt %. Generally, the nitrous acid is more soluble at 5° than at 20° C. and somewhat higher concentrations of nitrous acid are operable at lower temperatures. Higher concentrations are operable so long as the membrane is not deleteriously affected and the solutions can be handled safely. In general, concentrations of nitrous acid higher than about one-half (0.5) percent are not preferred because of difficulties in handling these solutions. Preferably, the nitrous acid is present at a concentration of about 0.1 weight percent or less because of its limited solubility at atmospheric pressure. The temperature at which the membrane is contacted can vary over a wide range. Inasmuch as the nitrous acid is not particularly stable, it is generally desirable to use contact temperatures in the range from about 0° to about 30° C., with temperatures in the range from 0° to about 20° C. being preferred. Temperatures higher than this range can increase the need for ventilation or super-atmospheric pressure above the treating solution. Temperatures below the preferred range generally result in reduced reaction and diffusion rates.

One preferred application technique involves passing the aqueous nitrous acid solution over the surface of the membrane in a continuous stream. This allows the use of relatively low concentrations of nitrous acid. When the nitrous acid is depleted from the treating medium, it can be replenished and the medium recycled to the membrane surface for additional treatment. Batch treatments are also operable. The specific technique for applying aqueous nitrous acid is not particularly limited and includes spraying, film coating, rolling, or through the use of a dip tank among other application techniques. Once treated the membrane may be washed with water and stored either wet or dry prior to use.

The reaction between the nitrous acid and the primary amine groups of the polyamide layer occurs relatively quickly once the nitrous acid has diffused into the membrane. The time required for diffusion and the desired reaction to occur will depend upon the concentration of nitrous acid, any pre-wetting of the membrane, the concentration of primary amine groups present, the 3 dimensional structure of the membrane and the temperature at which contact occurs. Contact times may vary from a few minutes to a few days. The optimum reaction time can be readily determined empirically for a particular membrane and treatment. After the residual amine moieties have been converted to the diazonium salts, the pH can be raised to 6-9 and the temperature increased to 25° C. to initiate hydrolysis of a fraction of the diazonium salts to phenols and azo-coupling between diazonium salts, phenols or the functionalized rings originating from incorporation of the subject amines.

The thin film polyamide layer may optionally include hygroscopic polymers upon at least a portion of its surface. Such polymers include polymeric surfactants, polyacrylic acid, polyvinyl acetate, polyalkylene oxide compounds, poly(oxazoline) compounds, polyacrylamides and related reaction products as generally described in U.S. Pat. No. 6,280,853; U.S. Pat. No. 7,815,987; U.S. Pat. No. 7,918,349 and U.S. Pat. No. 7,905,361. In some embodiments, such polymers may be blended and/or reacted and may be coated or otherwise applied to the polyamide membrane from a common solution, or applied sequentially.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention.

The invention claimed is:

1. A method for making a composite polyamide membrane comprising a porous support and a polyamide layer, wherein the method comprises the steps of:
   i) applying a polar solution comprising a polyfunctional amine monomer and a non-polar solution comprising a polyfunctional acyl halide monomer to a surface of a porous support and interfacially polymerizing the monomers to form a polyamide layer; and
   ii) exposing the polyamide layer to nitrous acid; wherein the method is characterized by:
      applying a subject amine compound to the interfacially polymerized polyamide layer prior to step ii) such that the subject amine compound reacts with residual acid chloride groups present on the surface of the polyamide layer,
   wherein the subject amine compound is different from the polyfunctional amine monomer and is represented by the following formula:

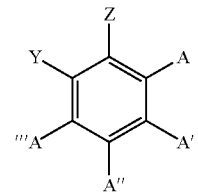

wherein:
   Z is: hydroxyl, alkoxy, ester, secondary or tertiary amine, or keto-amide;
   Y is: hydrogen, carboxylic acid, sulfonic acid or salt thereof, halogen, amine or an alkyl group having from 1 to 12 carbon atoms; and
   A, A', A" and A''' are independently: Z, hydrogen, or amine with the proviso that at least one of A, A', A" and A''' is a primary or secondary amine and that at least one of Y, A or A" is hydrogen.

2. The method of claim 1 wherein Z and at least one of A' or A''' is hydroxyl with the proviso that at least one of A or Y is hydrogen.

3. The method of claim 1 wherein Z and at least one of A' or A''' is a secondary or tertiary amine with the proviso that at least one of A or Y is hydrogen.

4. The method of claim 1 wherein: Z is: hydroxyl or methoxy; Y is: hydrogen, halogen or carboxylic acid; and A, A', A" and A''' are independently: hydrogen or amine with the proviso that at least one of A, A', A" and A''' is a primary or secondary amine and that at least one of A or A" is hydrogen.

5. The method of claim 1 wherein: Z is hydroxyl, A' is hydroxyl, and A is hydrogen provided at least one of A", A''' or Y is a primary or secondary amine.

6. The method of claim 1 wherein: Z is hydroxyl, A''' is hydroxyl, and Y is hydrogen provided at least one of A, A' or A" is a primary or secondary amine.

7. The method of claim 1 wherein the polyfunctional amine is a difunctional amine.

8. The method of claim 1 wherein at least one of the polar and non-polar solutions further comprises a tri-hydrocarbyl phosphate compound represented by following formula:

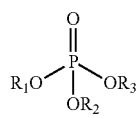

wherein $R_1$, $R_2$ and $R_3$ are independently: hydrogen or hydrocarbyl groups comprising from 1 to 10 carbon atoms, with the proviso that no more than one of $R_1$, $R_2$ and $R_3$ are hydrogen.

9. The method of claim 1 wherein the subject amine compound comprises at least one of: 3,5-diaminophenol, 2,4-diaminophenol, 3-aminophenol, 2-aminophenol, 4-aminophenol, 5-aminobenzene-1,3-diol, 3-amino-5-hydroxybenzoic acid, 3-amino-5-hydroxybenzenesulfonic acid, 5-methoxybenzene-1,3-diamine, 4-methoxybenzene-1,3-diamine, 3-methoxyaniline, 2-methoxyaniline, 4-methoxyaniline, 3-amino-5-methoxybenzoic acid, 3-amino-5-methoxybenzenesulfonic acid, N1,N1-dimethylbenzene-1,3-diamine, N1,N1-dimethylbenzene-1,3,5-triamine, N1,N1,N3,N3-tetramethylbenzene-1,3,5-triamine, N,N'-(5-amino-1,3-phenylene)bis(3-oxobutanamide), N-(4-amino phenyl)-3-oxobutanamide, 5-amino-1,3-phenylene bis(2,2,2-trifluoroacetate), 5-amino-1,3-phenylene diacetate, 3,5-bis((tert-butyldimethylsilyl)oxy)aniline, (3,5-bis((tert-butyldimethylsilyl)oxy) phenyl)methanamine, and 2-(3,5-bis((tert-butyldimethylsilyl)oxy) phenyl)ethanamine.

10. A method for making a composite polyamide membrane comprising a porous support and a polyamide layer, wherein the method comprises the steps of:
i) applying a polar solution comprising a polyfunctional amine monomer and a non-polar solution comprising a polyfunctional acyl halide monomer to a surface of a porous support and interfacially polymerizing the monomers to form a polyamide layer; and
ii) exposing the polyamide layer to nitrous acid; wherein the method is characterized by applying a subject amine compound to the interfacially polymerized polyamide layer prior to step ii) such that the subject amine compound reacts with residual acid chloride groups present on the surface of the polyamide layer, wherein the subject amine compound is different from the polyfunctional amine monomer and is represented by the following formula:

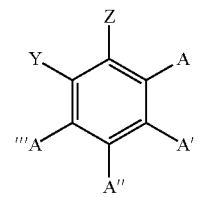

wherein:
Z is: hydroxyl, alkoxy, ester, secondary or tertiary amine or keto-amide;
Y is: hydrogen, carboxylic acid, sulfonic acid or salt thereof, halogen, amine or an alkyl group having from 1 to 12 carbon atoms; and
A, A', A" and A'" are independently: Z, hydrogen, or amine with the proviso that at least one of A, A', A" and A'" is a primary or secondary amine and that at least one of Y, A or A" is hydrogen; and wherein at least one of the polar and non-polar solutions further comprises a tri-hydrocarbyl phosphate compound represented by following formula:

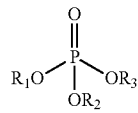

wherein $R_1$, $R_2$ and $R_3$ are independently: hydrogen or hydrocarbyl groups comprising from 1 to 10 carbon atoms, with the proviso that no more than one of $R_1$, $R_2$ and $R_3$ are hydrogen.

* * * * *